United States Patent

[11] 3,549,971

[72] Inventors John R. Van Patten
Charles W. Spangler, Waynesboro, Va.
[21] Appl. No. 727,957
[22] Filed May 9, 1968
[45] Patented Dec. 22, 1970
[73] Assignee General Electric Company
a corporation of New York

[54] REVERSING CONTROLLER
9 Claims, 1 Drawing Fig.
[52] U.S. Cl.................................................... 318/293,
318/294, 318/383
[51] Int. Cl...................................................... H02b 1/22
[50] Field of Search.......................................... 318/285,
293, 294, 383, 393, 394

[56] References Cited
UNITED STATES PATENTS
2,005,195 6/1935 McCabe....................... 318/285
2,394,111 2/1946 Schaelchlin et al........... 318/293

Primary Examiner—Oris L. Rader
Assistant Examiner—K. L. Crosson
Attorneys—Lawrence G. Norris, Michael Masnik, Stanley C. Corwin, Frank L. Neuhauser, Oscar B. Waddell and Melvin M. Goldenberg ABSTRACT: A reversing controller for providing forward or reverse current to a DC motor is described, in which it is necessary to use only a single heavy-duty relay contact, capable of withstanding reverse surge current. A power relay and a directional relay are included in the controller, the former for applying power to the armature and the second for connecting the armature in one of two current paths, each supplying armature current corresponding to a different direction of armature rotation. The controller includes a time delay switch, which may be a positive center-off switch, and is so constructed as to assure proper sequencing of the two relays for permitting operation of the directional relay to change the armature current path only when contacts of the power relay prevent the flow of armature current.

PATENTED DEC 22 1970
3,549,971
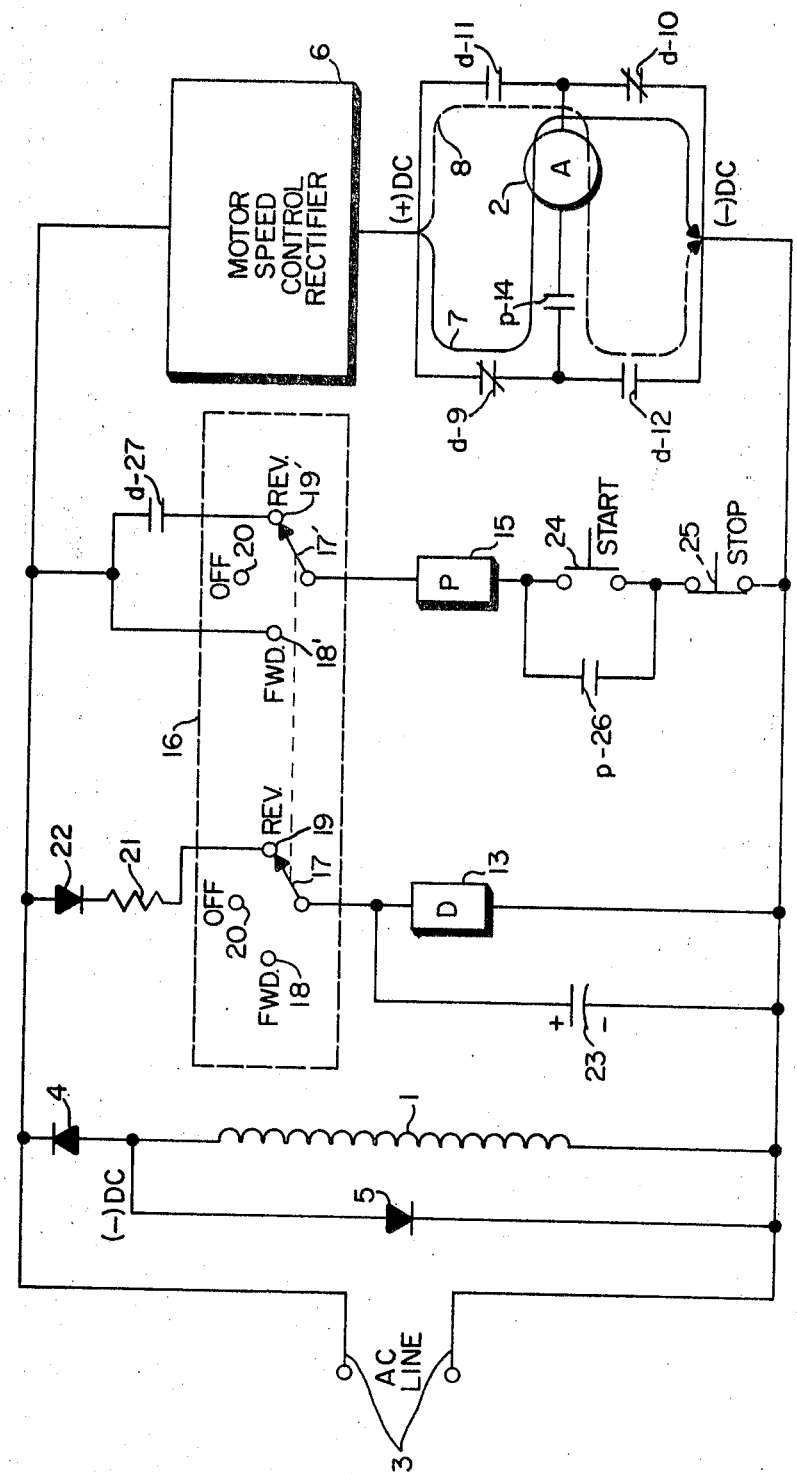
INVENTOR.
JOHN R. VAN PATTEN
CHARLES W. SPANGLER
BY
THEIR ATTORNEY

REVERSING CONTROLLER

BACKGROUND OF THE INVENTION

1. Field of the Invention

The direction of rotation of a DC motor is determined by the direction of current flow in its armature. This invention pertains to a reversing controller useful for controlling the direction of rotation of a DC motor by controlling the direction of its armature current.

2. History of the Prior Art.

A DC motor may be turned on in either the forward or reverse direction by a double-pole double-throw switch connected to the motor armature so as to supply line voltage of opposite polarity in one position from that supplied in the other position. Alternatively, a relay equivalent to such switch may be used.

Controllers using this relatively simple scheme have not proven satisfactory, for the reason that the current rating of the switch or relay contacts utilized must be extremely high in relation to the currents normally carried by such contacts. Such high current ratings are necessitated by the reverse surge current generated by the motor armature when voltage having a polarity opposite to the direction of armature rotation is applied to the armature. This occurs when the motor is turned off and immediately reenergized in the opposite direction. The reverse surge current flowing under these conditions is many times the steady state armature current for which the contacts must be rated.

Consequently, in fractional horsepower motors up to about one horsepower, contacts subject to reverse surge current must conventionally be rated at considerably more than steady state rating. Further, this rating must be a dynamic rating, for the surge current occurs upon switching, when the contacts are operative. Practically, this means that reversing controllers for small DC motors are often substantially larger than the motors themselves.

In order to reduce the size and cost of such controllers, various circuits have been proposed which permit the use of smaller contacts or of fewer contacts rated to carry reverse surge current. Certain of such circuits include holding relays or sensing devices of one sort or another for preventing rapid reenergization of the armature, after the current in it has been turned off, in a direction opposite that of the current prior to turn-off. In one such circuit, for example, a transistor senses armature voltage and operates a relay to prevent reenergization until after armature voltage has dropped below a predetermined level. In another device, such a holding relay is provided in conjunction with contacts incorporated in the motor start-stop control. In order to reverse the motor, the stop button must be depressed before the reversing control can become effective; the latter is prevented from becoming effective after depression of the stop switch until armature voltage has dropped below a level necessary to energize a holding relay.

SUMMARY OF THE INVENTION

According to the invention, separate directional and power relays are provided, the former for controlling the direction of armature current flow and the latter for energizing the armature. Means are provided, including a time-delay switch, for controlling the sequence of operation of these relays so that operation of the directional relay is permitted only when load current has been interrupted by the power relay. By this means, only the power relay contact need be dynamically rated to carry reverse surge current; the remaining relay contacts need only carry such current after they have been closed and may consequently be very much smaller.

In a preferred embodiment of the invention the time-delay switch is a double-pole, three position positive center-off switch, in which the positive center-off provision introduces the requisite time delay between the remaining two positions, corresponding to forward and reverse armature current. A capacitor-delay circuit controls relay sequencing in one direction of current reversal, while a normally-open directional relay contact connected in series with the power relay coil controls sequencing in the other direction of current reversal.

Compared to reversing controllers currently in commercial use, the invention provides a controller which is several times smaller and costs only about one tenth as much to manufacture. Moreover, current reversal need not wait, after the motor is deenergized until armature voltage has decayed below a predetermined safe level, as is the case with the previously suggested circuits mentioned above. While normal operation of the controller of this invention involves pushing a start button after reversing the directional control, provision is made so that even so-called "plug-reversing" (that is, applying reverse power while the motor is still rotating forward) does not damage the controller. Further, since armature current is not required to flow in the relay coils which control switching of the armature current, according to the invention, the control switches may be more easily located at a control station remote from the motor installation.

BRIEF DESCRIPTION OF THE DRAWING

The invention will be described in greater detail in conjunction with the accompanying drawing, which is a schematic circuit diagram of an embodiment of the invention.

DESCRIPTION OF A PREFERRED EMBODIMENT

As shown in the accompanying drawing, a DC motor having a field winding 1 and an armature 2 is connected to derive power from AC line terminals 3. DC field excitation is provided by diode 4 during one half cycle of the AC line voltage and diode 5 provides a path for field current to flow during the opposite half cycle of the AC line voltage. Armature current amplitude is controlled by a speed control rectifier circuit 6, which is not part of this invention.

Speed control rectifier 6 produces a DC current which can flow through the armature in either of two directions, depending upon whether the rectifier and armature are connected to line terminals 3 through a first current path 7 (sold arrow) or a second current path 8 (broken arrow). These current paths are defined by a directional relay including directional relay contacts d-9 through d-12, which are controlled by directional relay coil 13. In particular, a first current path 7 through the load (armature 2) is defined by normally-closed directional relay contacts d-9 and D-10, when no current flows in a directional relay coil 13. When relay coil 13 is actuated, it opens contacts d-9 and d-10, and concurrently closes normally-open directional relay contacts d-11 and d-12, which thereby define a second current path 8 through the armature in a direction opposite that of the first current path. Thus the first and second current paths correspond to opposite directions of rotation of the armature. A power relay contact p-14, controlled by power relay coil 15, is common to both current paths and is in series with the load in each path. Note that directional relay contacts are not intended to interrupt high motor current, i.e., when power relay contact p-14 is still closed, because arcing could cause the normally-closed and normally-open directional relay contacts to be effectively closed at the same time. If this occurs, then line terminals 3 are short-circuited together through speed control rectifier 6, which may cause serious damage to rectifier 6 and the directional contacts.

The controller includes a time-delay switch, which in the preferred embodiment shown is a double-pole, three position, positive center-off switch 16. A positive center-off switch, which in itself is not new, is a manually operated switch which is operable to three positions, the center one being the "off" position. It cannot be operated in a continuous motion between its two end positions (i.e. at the two ends of travel of the switch handle); pressure on the switch handle, or toggle, must be released and reapplied at the center "off" position in order to operate the switch to the opposite end position.

It should be noted that the delay of the push to off push to reverse action of switch 16 provides the time necessary to properly sequence the operation of the power and directional relays.

Switch 16 is operable to a first position, in which its moveable contacts 17 and 17' contact "forward" electrical contacts 18 and 18'. Contacts 18 and 18' are referred to as "forward" contacts because they connect the directional and power relay coils, as will be seen, to provide armature current corresponding to an arbitrarily chosen forward direction of armature rotation. At the other end of the path of travel of moveable contacts 17 and 17', the switch is in a second position in which the moveable contacts electrically contact so-called "reverse" contacts 19 and 19' to connect the armature in the second electrical path, corresponding to an arbitrarily chosen "reverse" direction of the motor, as will be seen.

Between the two sets of forward and reverse contacts 18, 18' and 19, 19** are a set of "off" contacts 20, 20', in which position of the switch the armature is disconnected from line terminals 3 by opening power contact $p$–14.

Moveable contact 17 is connected to directional relay coil 13, and the two are connected in series between line terminals 3 when the switch is in its second (shown) position. Also included in series with relay coil 13 are a resistor 21 and a diode 22. Capacitor 23 in parallel with coil 13, forms a capacitor delay circuit. REsistor 22 limits charge current into capacitor 23 and drops line voltage to the proper level for relay coil 13. Diode 22 serves merely to deliver direct current to coil 13.

Moveable contact 17', which is mechanically ganged with contact 17, is connected to power relay coil 15, and the two elements are placed in series across line terminals 3 when switch 16 is in either of its first ("forward") and second ("reverse") positions.

Start and stop pushbutton switches 24 and 25 are connected in series with power relay coil 15. The start switch is normally open and is connected in parallel with a normally-open power relay contact $p$–26 to form a holding circuit for the power relay, which may be interrupted by actuating the (normally-closed) stop pushbutton.

A normally-open directional relay contact $d$–27 is connected in series with the power relay coil switch 16 is in its second ("reverse") position, i.e., that position in which directional relay coil 13 is connected by the switch to be energized.

In normal operation of the controller, time-delay reversing switch 16 is placed in either its forward or reverse position to connect the armature in the first or second current path. IN its first (forward) position, directional relay coil 13 is not energized, so that normally-closed contacts $d$–9 and $d$–10 connect the load in the first current path 7 through the contacts $p$–14 which are assumed closed. These latter contacts are closed since power relay coil 15 is energized from the AC lines 3 through closure of 17' with 18', the start button 24 had previously operated and $p$–26 was closed. In switching to the second (reverse) position, movement of contact 17' from 18' deenergizes relay coil 15 which causes $p$–14 contacts to open (with a time lag which will be explained later). In its second (reverse) position switch 16 connects coil 13 to the AC line terminals 3, and current rectified by diode 22 energizes the relay coil to close normally-open directional relay contacts $d$–11 and $d$–12 and open the contents $d$–9 and $d$–10. That is, upon energization of 13 (only after moveable contact 17 closes on fixed contact 19), contact $d$–9 opens as $d$14 12 closes, and $d$–11 closes as $d$–10 opens.

To connect the armature in current path 8, start switch 24 must be depressed to connect power relay coil 15 to line terminals 3, closing relay contact $p$–14 to permit current to flow through the armature in the direction defined by the particular current path in which the armature has been connected. Power relay coil 15 also closes contact $p$–26 to maintain itself energized even after the start switch is released. The motor may subsequently be stopped by pressing stop-switch 25 to deenergize power relay coil 15, thereby interrupting the armature current by opening contact $p$–14.

Note that with reversing switch 16 in its second (reverse) position, normally-open directional relay contact $d$14 27 is in series with power relay coil 15; this contact is closed, permitting energization of coil 15, since the directional relay is energized in this switch position.

It will thus be apparent that in its first (forward) position, switch 16 controls the directional and power relays to respective first states for providing current flow in the armature in one direction; in its second (reverse) position, switch 16 controls the directional and power relays to respective second states, in which armature current is provided in the opposite direction.

An understanding of the means provided for controlling the sequence of operation of the directional and power relays to assure that the directional relay contacts are operative only at zero armature current may best be gained from considering operation of the controller under the worst possible conditions; that is, with start switch held on, and the motor switched between forward and reverse by reversing switch 16.

Starting with switch 16 in its center-off position, and moving it to the "forward" position, so that contact 17' closes on 18', power relay coil 15 is energized to close contact $p$–14, starting the motor.

Moving switch 16 from its forward position towards the reverse position, relay coil 15 is deenergized (coil 13 already being deenergized in its FWD position) deenergized, while the switch contacts are between their first (forward) and second (reverse) states of operation. Note that the power relay is an AC relay, and therefore has a lag time between deenergization of power relay coil 15 and opening of power relay contact $p$–14 to interrupt armature current, which varies depending on the point in the line current cycle (that is, the instantaneous amplitude of the AC line current) at which switching occurs. Assume the maximum lag time to be 25 milliseconds. To assure that relay contact $p$–14 disconnects the armature before switch 16 can be moved to its second (reverse) position, thereby operating the directional relay, the delay time of switch 16 —i.e., the minimum time in which it can be switched between its first and second positions—must be greater than this lag time. With a lag time of 25 milliseconds, the switch delay time may conveniently be 100 milliseconds.

When switch 16 reaches its second position, corresponding to the second states of the power and directional relays, the directional relay must be made to operate before the power relay does. If this sequence is not assured, a normally-open directional relay contact (say, $d$–11) may close before a normally-closed contact (say, $d$–10) opens, since the latter may be held shut by arcing, thus creating a short circuit across line terminals 3.

To prevent this condition from occurring, normally-open directional relay contact $d$–27 is placed in series with coil 15 in its second (reverse) state, so that while energization of power relay coil 15 commences with closing of $d$–27, operation or pickup of the relay takes about 15 milliseconds of time after energization and after the directional relay has finished changing state.

Finally, going from reverse to forward, with the "start" switch still maintained depressed, operation of power relay contact $p$–14 to disconnect the armature must occur before operation of the directional relay to change current paths.

It is therefore necessary to delay operation of the directional relay for a time longer than the maximum lag time of the power relay, yet less than the delay time of reversing switch 16. This is achieved by the capacitor 23, which maintains sufficient voltage across coil 13 to keep the directional relay actuated for a delay period determined by the size of the capacitor and the impedance of coil 13. This assures that the power relay operates to shut-off armature current before operation of the directional relay out of its second (reversing) state. This delay period is made less than the delay time of switch 16, to permit deenergization of directional relay coil 13 before power relay coil 15 can be reenergized through contact 18' of switch 16 and in this embodiment is 40 milliseconds.

It will be seen that even in the above-described worst case of plug reversal, the sequence of operation of the power and directional relays was such that the latter operated only at 0 armature current.

It will be apparent to those skilled in the art that the above-described embodiment may be modified without departing from the scope and spirit of the invention, which is limited only in accordance with the following claims.

We claim:

1. A reversing controller for reversing the polarity of current applied to an electrical load comprising:
   directional relay means operable to a first state for connecting such load in a first current path and operable to a second state for connecting such load in a second current path;
   power relay means operable for making both of said paths continuous when in each of said states and for interrupting both of said paths when between said first and second states, said power relay means having a time lag in the operation of said power relay means and said interruption of said paths;
   common switching means operable for switching the directional relay means between its respective first and second states and for operating said relay means, said switching means including a time delay for preventing such switching in either direction in less than a predetermined delay time which is longer than said time lag; and
   sequencing means operative during each actuation of the switching means for controlling the sequence of operation of the directional and power relay means to permit operation of the former only when current in the first or second current path has been interrupted by the latter.

2. A reversing controller for reversing the polarity of current applied to an electrical load comprising:
   directional relay means normally in a first state for connecting such load in a first current path and operable to a second state for connecting such load in a second current path;
   power relay means operable to interrupt current flow in both of said first and second paths and operable for permitting current flow in either current path in both of said states, there being a time lag in the operation of the power relay means and the consequent interruption of said paths;
   switching means operable for switching the directional relay means between its respective first and second states and for operating said power relay means, said switching means including a time delay means for preventing such switching in either direction in less than a predetermined delay time which is longer than said time lag; and
   sequencing means operative during each actuation of the switching means for controlling the sequence of operation of the directional and power relay means to permit operation of the former only when current in the first and second current paths is interrupted by the latter.

3. A reversing controller as defined in claim 2 wherein said sequencing means is operative upon switching of the directional relay means from its first to its second state for delaying operation of the power relay means to permit current flow until completion of the operation of the directional relay means, and is operative upon switching of the directional relay means from its second toward its first state for delaying operation of the directional relay means until completion of the operation of the power relay means to interrupt current flow, said last mentioned delay being less than the switching means delay time.

4. A reversing switch as defined in claim 3 wherein said sequencing means includes:
   1. a normally-open relay contact forming part of the directional relay means and connected in series with the power relay means for preventing operation of the power relay means to permit current flow, after actuation of the switching means, until completion of the operation of the directional relay means; and
   2. a capacitor delay circuit connected in circuit with the directional relay means, operative when the directional relay means is switched out of its first state for a time less than the switching means delay time and greater than the time lag of said power relay means.

5. A controller as defined in claim 4 including:
   a pair of AC line terminals;
   said power relay means including a second normally-open power relay contact controlled by the power relay coil and connected in series with the electrical load in both current paths;
   said directional relay means including a directional relay coil and a diode connected between said line terminals, a plurality of normally-closed relay contacts controlled by the directional relay coil defining said first current path, and a plurality of normally-open -open relay contacts controlled thereby defining said second current path; and
   said capacitor delay circuit includes a capacitor connected in parallel with the directional relay coil for maintaining the directional relay coil operative, after actuation of the switching means to switch the directional relay means out of its second state, for a time less than the switching means delay time and greater than the time lag of said power relay means.

6. A controller as defined in claim 5 wherein said switching means is a positive center-off switch operable to positions corresponding to said first and second states and to an off position between them.

7. A controller as defined in claim 6 wherein said load is a DC motor armature, and the second normally-open relay contact in said power relay means is a heavy-duty relay contact capable of withstanding the reverse surge current of said armature, all remaining relay contacts having current ratings substantially lower than said reverse surge current.

8. A reversing controller for reversing the polarity of current supplied to an armature of a DC motor, comprising:
   first directional relay contacts, normally open, defining a first current path for supplying current to the armature in a first direction;
   second directional relay contacts, normally closed, defining a second current path for supplying current to the armature in a second direction;
   a power relay contact, normally open, connected in series with the load in both the first and second current paths;
   a power relay coil for closing the power relay contact, when energized, and opening the power relay contact when deenergized, there being a lag time between such deenergization and opening;
   a directional relay coil for actuating the directional relay contacts, when energized;
   switching means operable to a first position in which it is connected to energize the power and directional relay coils, and operable to a second position in which it is connected to energize only the power relay coil, and including means for preventing operation of said switching means between its first and second positions in less than a predetermined delay time longer than the power relay coil lag time, so that in said first position, the power relay coil closes the power relay contact to permit current flow in said first current path, and in said second position, the directional relay coil and power relay coil act to permit current flow in the second current path, said first and second current paths carrying current through the armature in opposite directions; and
   sequencing means including (1) a capacitor connected in parallel with the directional relay coil for delaying deenergization of the directional relay coil by the time constant of said coil and capacitor after the switching means is switched out of its second position, to assure opening of the power relay contact before deenergization of the directional relay coil, and (2) a further normally-open directional relay contact connected in series with the power relay coil when the switching means is in its second position, for delaying energization of the power relay coil until after operation of the directional relay contacts.

9. A reversing controller as defined in claim 8 including an AC power source connected to supply power to the directional and power relay coils, wherein said means for preventing operation of said switching means comprise said switching means having said first and second positions and a center-off position between them in which none of said relay coils is energized.